(12) United States Patent
Bonnes et al.

(10) Patent No.: US 7,152,897 B2
(45) Date of Patent: Dec. 26, 2006

(54) ARTICLE ATTACHMENT SYSTEM

(75) Inventors: Keith A. Bonnes, Holland, MI (US); Linh Pham, Holland, MI (US); Kenneth M. Clark, Holland, MI (US); Craig D. Flowerday, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 108 days.

(21) Appl. No.: 10/511,646

(22) PCT Filed: Apr. 22, 2002

(86) PCT No.: PCT/US02/12562

§ 371 (c)(1), (2), (4) Date: Oct. 18, 2004

(87) PCT Pub. No.: WO03/089265

PCT Pub. Date: Oct. 30, 2003

(65) Prior Publication Data

US 2005/0242604 A1    Nov. 3, 2005

(51) Int. Cl.
B60R 7/04  (2006.01)

(52) U.S. Cl. ............................................. 296/35.1

(58) Field of Classification Search ............... 296/24.3, 296/24.34, 37.1, 37.8, 37.14, 65.13, 35.1; 191/22 R, 23 R; 297/311, 312, 344.1–344.11
See application file for complete search history.

(56) References Cited

U.S. PATENT DOCUMENTS

| 1,306,498 | A | 6/1919 | Moses |
|---|---|---|---|
| 1,674,340 | A | 6/1928 | Nock |
| 1,703,729 | A | 2/1929 | Frais |
| 2,120,619 | A | 6/1938 | Matthiesen |
| 2,929,539 | A | 3/1960 | Safreno |
| 3,356,409 | A | 12/1967 | Belsky et al. |
| 3,451,035 | A | 6/1969 | Baldwin |
| 3,474,381 | A | 10/1969 | Baldwin |
| 3,984,161 | A | 10/1976 | Johnson |
| 4,173,382 | A | 11/1979 | Booty |
| 4,182,532 | A | 1/1980 | Walker, Sr. |
| 4,469,365 | A | 9/1984 | Marcus et al. |
| 4,598,948 | A | 7/1986 | Flowerday |
| 4,685,729 | A | 8/1987 | Heesch et al. |
| 4,738,481 | A | 4/1988 | Watjer et al. |
| 4,809,897 | A | 3/1989 | Wright, Jr. |

(Continued)

FOREIGN PATENT DOCUMENTS

DE    23 59 718 A1    6/1975

(Continued)

OTHER PUBLICATIONS

*Automotive & Transportation INTERIORS*, a Publication of Shore-Varrone, Inc., "Innovation in the most pleasing form!," Nov. 1998, (2 pgs.).

(Continued)

*Primary Examiner*—H Gutman
(74) *Attorney, Agent, or Firm*—Foley & Lardner LLP

(57) ABSTRACT

An article attachment system for a vehicle includes an elongated rail attached to the interior of the vehicle. The rail has a partially enclosed space with at least one slide interface and a series of projections. A bracket engages the rail for mounting at least one article to the rail. A positioning device engages the bracket and has at least one extension movable between an engaged position for securing the article to the rail and a released position for moving the article relative to the rail.

45 Claims, 4 Drawing Sheets

U.S. PATENT DOCUMENTS

| | | |
|---|---|---|
| 4,818,017 A | 4/1989 | Dykstra et al. |
| 4,867,498 A | 9/1989 | Delphia et al. |
| 4,887,196 A | 12/1989 | Brown et al. |
| 4,974,129 A | 11/1990 | Grieb et al. |
| 4,998,770 A | 3/1991 | Shimizu et al. |
| 5,040,990 A | 8/1991 | Suman et al. |
| 5,067,625 A | 11/1991 | Numata |
| 5,076,641 A | 12/1991 | Lindberg |
| 5,077,643 A | 12/1991 | Leach |
| 5,085,481 A | 2/1992 | Fluharty et al. |
| 5,113,318 A | 5/1992 | Conley |
| 5,128,847 A | 7/1992 | Lin et al. |
| 5,154,617 A | 10/1992 | Suman et al. |
| 5,180,089 A | 1/1993 | Suman et al. |
| RE34,333 E | 8/1993 | Boerema et al. |
| 5,285,941 A | 2/1994 | Herrera |
| 5,303,970 A | 4/1994 | Young et al. |
| 5,338,081 A | 8/1994 | Young et al. |
| 5,397,160 A | 3/1995 | Landry |
| 5,433,509 A | 7/1995 | Hotary et al. |
| D361,972 S | 9/1995 | Ney et al. |
| 5,562,331 A | 10/1996 | Spykerman et al. |
| 5,599,086 A | 2/1997 | Dutta |
| 5,611,589 A | 3/1997 | Fujii et al. |
| 5,810,434 A | 9/1998 | Thompson et al. |
| 5,820,197 A | 10/1998 | Lanser |
| 5,823,599 A | 10/1998 | Gray |
| 5,845,965 A | 12/1998 | Heath et al. |
| 5,863,089 A | 1/1999 | Ignarra et al. |
| 5,893,603 A | 4/1999 | Viertel et al. |
| 5,897,155 A | 4/1999 | Kerner et al. |
| 5,927,784 A | 7/1999 | Vitito |
| 5,951,084 A | 9/1999 | Okazaki et al. |
| 5,954,252 A | 9/1999 | Gebreselassie et al. |
| 6,003,927 A | 12/1999 | Körber et al. |
| 6,019,411 A | 2/2000 | Carter et al. |
| 6,045,173 A | 4/2000 | Tiesler et al. |
| 6,062,623 A | 5/2000 | Lemmen |
| 6,086,129 A | 7/2000 | Gray |
| 6,092,704 A | 7/2000 | Baumeister |
| 6,116,674 A | 9/2000 | Allison et al. |
| 6,135,529 A | 10/2000 | De Angelis et al. |
| 6,152,522 A | 11/2000 | Boulay et al. |
| 6,158,639 A | 12/2000 | De Silva et al. |
| 6,158,795 A | 12/2000 | Gray et al. |
| 6,174,019 B1 | 1/2001 | Collet et al. |
| 6,176,536 B1 | 1/2001 | Miller et al. |
| 6,203,088 B1 | 3/2001 | Fernandez et al. |
| 6,234,570 B1 | 5/2001 | Quinno et al. |
| 6,250,729 B1 | 6/2001 | Allison et al. |
| 6,264,261 B1 | 7/2001 | Krafcik |
| 6,267,428 B1 | 7/2001 | Baldas et al. |
| 6,293,616 B1 | 9/2001 | Williams et al. |
| 6,321,960 B1 | 11/2001 | Ellis et al. |
| 6,338,517 B1 | 1/2002 | Canni et al. |
| 6,367,857 B1 | 4/2002 | Kifer et al. |
| 6,419,314 B1 | 7/2002 | Scheerhorn |
| 6,428,072 B1 | 8/2002 | Moore |
| 6,435,587 B1 | 8/2002 | Flowerday et al. |
| 6,644,526 B1 | 11/2003 | Pegorier |
| 6,648,393 B1 * | 11/2003 | Milnar et al. ............ 296/65.11 |
| 6,726,267 B1 | 4/2004 | Kim et al. |
| 6,752,444 B1 | 6/2004 | Kitano et al. |
| 2001/0030436 A1 | 10/2001 | Kifer et al. |
| 2001/0030440 A1 | 10/2001 | Ney |
| 2002/0163219 A1 | 11/2002 | Clark et al. |
| 2003/0067183 A1 | 4/2003 | Moore |
| 2003/0107228 A1 | 6/2003 | Ono et al. |
| 2003/0197392 A1 | 10/2003 | Clark et al. |
| 2003/0234550 A1 | 12/2003 | Brooks et al. |
| 2004/0026947 A1 | 2/2004 | Kitano et al. |

FOREIGN PATENT DOCUMENTS

| | | |
|---|---|---|
| DE | 31 51 298 A1 | 7/1983 |
| DE | 86 18 079.7 | 4/1987 |
| DE | 41 16 758 A1 | 11/1992 |
| DE | 690 03 767 T2 | 5/1994 |
| DE | 44 38 623 A1 | 6/1995 |
| DE | 195 29 876 A1 | 2/1997 |
| DE | 198 22 638 A1 | 12/1999 |
| DE | 198 56 979 A1 | 3/2000 |
| DE | 19856979 | 3/2000 |
| DE | 199 09 732 A1 | 9/2000 |
| DE | 201 03 563 U1 | 7/2001 |
| DE | 298 08 950 U1 | 8/2001 |
| EP | 0 117 131 A2 | 8/1984 |
| EP | 0 178 196 B1 | 10/1988 |
| EP | 0 189 051 B1 | 5/1989 |
| EP | 0 342 345 B1 | 1/1994 |
| EP | 0 795 437 A2 | 9/1997 |
| EP | 1 092 590 A1 | 4/2001 |
| EP | 1 245 446 B1 | 5/2004 |
| EP | 0 841 211 B1 | 12/2004 |
| EP | 1516772 A2 * | 3/2005 |
| JP | 57158140 | 9/1982 |
| JP | 57-167838 | 10/1982 |
| JP | 61-150237 | 7/1986 |
| JP | 62-194955 | 8/1987 |
| JP | 9-58359 | 3/1997 |
| JP | 9-58360 | 3/1997 |
| JP | 9-58361 | 3/1997 |
| JP | 11-129827 | 5/1999 |
| JP | 2000-103290 | 4/2000 |
| JP | 2000-325181 | 11/2000 |
| JP | 2001-55091 | 2/2001 |
| WO | WO 99/48724 | 9/1999 |
| WO | WO 01/28807 A1 | 4/2001 |

OTHER PUBLICATIONS

Johnson Controls DESIGN Worldwide, © Johnson Controls, Concept Sketch, 1994, (1 pg.).

O-ZONE, "Power Spine®", bearing an indication of © 1996 Prince Corporation, Jul. 23, 1996, (2 pgs.).

Prince Corporation, O-Zone Project, "Reposition Features," bearing an indication of May 1, 1996-Nov. 1, 1996, (7 pgs.).

* cited by examiner

ARTICLE ATTACHMENT SYSTEM

This Application claims priority under 35 U.S.C. § 119 to PCT Application No. PCT/US02/12562, filed on Apr. 22, 2002 and titled "Article Attachment System" which is incorporated by reference herein.

FILED OF THE INVENTION

The present invention relates to an article attachment system for a motor vehicle. The present invention relates more particularly to an article attachment system slideably mounting and removably attaching an article in a motor vehicle.

CROSS-REFERENCE TO RELATED APPLICATIONS

The following patent application is hereby incorporated by reference: U.S. Pat. No. 6,203,088 titled "Sliding Center Console System" issued Mar. 20, 2001.

BACKGROUND

The use of systems for mounting articles such as consoles in vehicles has been known for many years. In many systems, the articles or consoles are fixed in a single location and may include instruments, gauges, storage compartments, cup holders, as well as functional devices such as the gear shift lever, the parking brake actuator, side window adjusters, etc. It is also known that a variety of lids or covers may be used with consoles to conceal items such as coins, CD's, tapes, and other personal items used by the driver or vehicle occupants. Covers for such compartments are usually pivoted along one edge so that they may be opened to provide access and closed to provide either an armrest or other functionality. It is also known that storage devices may be located in instrument panels, including, for example, cigarette ashtrays, cup or can holders, etc.

In U.S. Pat. No. 6,203,088 issued Mar. 20, 2001, to Fernandez et al., and entitled "Sliding Console System", a system is described which includes a track to provide longitudinal movement for a console body within a vehicle. The illustrated embodiment also shows multiple console bodies which can each be adjusted independently of one another. The consoles may have power provided by an electric cable or sliding contact with the track so that one or more electrical devices can be contained in the consoles. The electrical functionality includes such features as controls for entertainment systems, climate control, seat adjustment, mirror adjustment, vehicle lighting, rear window defroster switches, as well as for use of such devices as radios, telephones, or computer power ports. The disclosure of the patent indicates that the console functionality may be used by the rear row seat occupants, as well as by the front row occupants, however, there is no suggestion in the patent of having a concealed positioning device or the capability to provide multiple articles for use with the track.

Another system involving fore and aft movement of a vehicle component is shown in U.S. Published patent application 2001/0030440 A1, published Oct. 18, 2001. The "Vehicle Seat Assembly" includes a fixed center console between the front seats and a translatable center seat which moves from a rearward position in which it is aligned with the second row seats to a forward position in which it is located more closely to the front seats. In the preferred embodiment of this patent, the center seat includes a child safety seat mounted thereon.

A variety of other translatable console systems are known in the art. For example, Belsky et al. in U.S. Pat. No. 3,356,409 issued Dec. 5, 1967 for "Sliding Console" discloses a console that rides along the top of a raised floor portion and can be moved fore and aft. The device disclosed in this patent also includes an air passage to assist in moving air from in front of the console to the vehicle environment behind it.

A console box that can move forwardly and rearwardly is disclosed in U.S. Pat. No. 5,951,084 issued to Okozaki et al. on Sep. 14, 1999 for "Seat Structure for a Vehicle." The console forms a portion of a rear seat and includes a cavity and a portion which folds down to form an armrest. A carriage including rollers facilitates console movement.

Another console which includes a translatable portion is disclosed in U.S. Pat. No. 4,685,729, issued to Heesch on Aug. 11, 1987 for "Retractable Console for an Automotive Vehicle". In this device, a screw drive moves the portion so that the device can function as a passenger seat or a storage console.

Boulay et al. in U.S. Pat. No. 6,152,522 issued on Nov. 28, 2000 for "Vehicle" shows and describes a console which may be placed in various longitudinal locations on a ventilation shaft extending down the center axis of a vehicle. In addition to providing center console functionality of the type described above, the console assists in controlling cockpit air conditioning.

Krafeik in U.S. Pat. No. 6,264,261, issued Jul. 24, 2001 for "Vehicle Console" discloses a fore and aft translatable dual purpose console. When opened, anchorage rods for securing child seats are presented for use. The area beneath the open top can hold a variety of articles.

DeAngelis et al., in U.S. Pat. No. 6,135,529 issued Oct. 24, 200 for "Multi-Position Sliding Center Console", shows a carriage mounted console that can be moved fore and aft from between a front row of seats to a rearward location. A track extending below the console includes slots, and the console is moved or locked into position by manipulation of a latch.

Yet another sliding console is shown in Japanese Patent No. 62-194953. This device is similar to some of the aforementioned consoles and allows for the console to slide under the front instrument panel by fixing a guide rail between the cabin front and a position between the seats. In addition, the gear shift lever is separately slidable along the same rails to allow optimum functioning at the side of the front seat, while maintaining a compact construction when the shift lever and the console are stored, one within the other.

While the general concept of console movement is addressed in the above patent art, generally ignored is the concealment of a positioning mechanism to reduce the introduction of contaminants and other foreign material that may otherwise interfere with the movement of the article, and to conceal pinch-points that may be created by the interface of moving or engaging parts. Also generally ignored is the removability of the console and the ability to interchange the console with other consumer oriented articles useful in connection with a vehicle interior. Also generally ignored is the ability to move the console or article to a position beneath or nested with an instrument panel within the vehicle.

For example, it would be advantageous to configure a positioning system for an article in a manner that minimizes introduction of contaminants and other foreign materials commonly found in vehicle interiors to improve the functionality of the positioning system. It would also be advantageous to provide an article attachment system with a positioning system for placing the article in one of a plurality of incremental positions in a manner that conceals engageable components that may create pinch-points or hazards to a user. It would be further advantageous to provide an article attachment system having a positioning system adapted to self-engage in the event that is misaligned by a user. It would be further advantageous to provide an article attachment system where the article may be removed from the vehicle. It would also be advantageous to provide an article attachment system capable of receiving other consumer-oriented articles useful with a vehicle interior that are adapted to engage the positioning system. It would also be advantageous to provide an article attachment system capable of sliding an article to a position beneath or nested with an instrument panel in a vehicle. It would also be advantageous to provide an article attachment system having an integral lighting system for improved night time illumination. It would also be advantageous to provide an article attachment system with a sensor indicating when the article is not secured within the vehicle.

Accordingly, it would be advantageous to provide an article attachment system having these or other advantageous features.

SUMMARY OF THE INVENTION

The present invention relates to an article attachment system for a vehicle, having an elongated rail member adapted to attach to the vehicle where the rail member defines at least one partially enclosed space having at least one slide interface and a plurality of projections, and a bracket operably engaging the rail and adapted for mounting at least one article, and a positioning device operably engaging the bracket and having at least one extension adapted to move between an engaged position adapted for securing the article to the rail and a released position adapted for moving the article relative to the rail.

The present invention also relates to an article attachment system for a vehicle interior having an elongated rail member coupled to a floor portion of the vehicle interior where the rail member defines at least one partially concealed channel having a slide interface and a plurality of positioning elements; a bracket adapted to couple to an article, the bracket having at least one non-rotational glide operably engaging the slide interface for longitudinal movement along the rail member; and a positioning device coupled to the bracket for selectively securing the bracket at one of a plurality of locations along the rail member.

The present invention further relates to a kit for an article attachment system, having a rail member adapted for attachment to the interior portion of a vehicle where the rail defines at least one partially enclosed space having at least one surface adapted for slideable engagement, and a bracket member adapted to couple to an article and adapted to slideably engage the surface, and a positioning device adapted to releasably secure the article in any one of a plurality of locations on the rail member, and an actuator adapted to move the positioning device between an engaged position where movement of the article is prevented and a released position where movement of the console is permitted.

The present invention also relates to a method of providing an article attachment system for use in a vehicle interior, including the steps of providing a rail member adapted for coupling to the vehicle interior, the rail member defining a partially enclosed space having a surface, and providing a bracket adapted to receive an article and adapted to engage the surface, and coupling a positioning device to the bracket, where the positioning device is adapted for movement between an engaged position where the positioning device engages the rail member and a released position where the positioning device is substantially free of engagement from the rail member, and coupling the article to the rail member.

The present invention further relates to a system for removably attaching one or more articles in a vehicle interior and includes means for providing an elongated rail member having a partially concealed space, means for coupling the elongated rail member to the vehicle interior, means for mounting an article to the elongated rail member, and means for releasably securing the article in plurality of positions on the elongated rail member.

BRIEF DESCRIPTION OF THE DRAWINGS

In the various drawings, like reference numerals are used to indicate like components.

DETAILED DESCRIPTION OF THE PREFERRED AND ALTERNATE EMBODIMENTS

Figure 1:
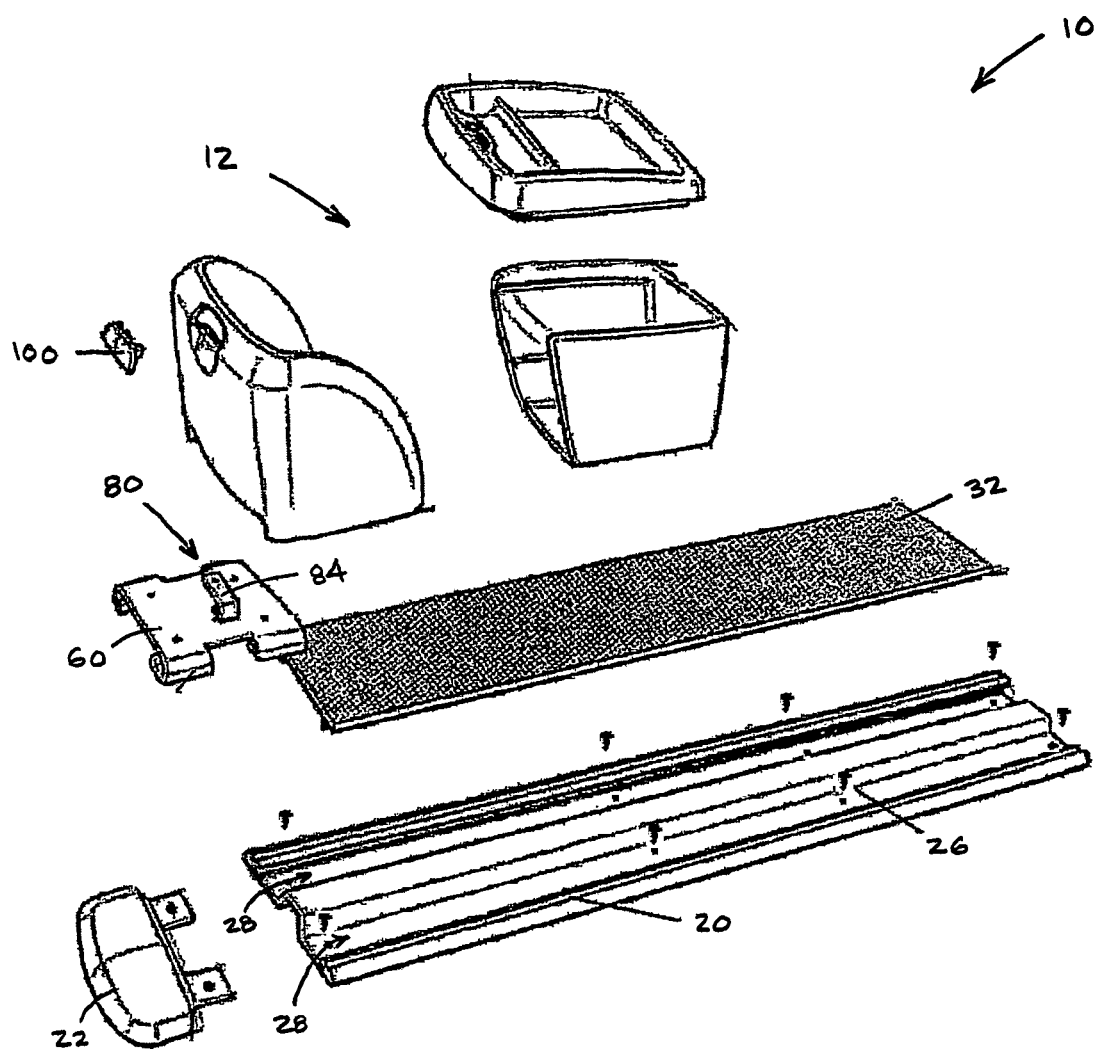
FIG. 1 is an exploded perspective view from a rear end of an article attachment system according to a preferred embodiment of the present invention.

Referring to FIG. 1, an article attachment system 10 is shown according to a preferred embodiment. Article attachment system 10 includes an elongated base member (e.g. track, runner, guide, etc.) shown schematically as a rail member 20, a movable support interface (e.g. slider, cover, etc.) shown schematically as a bracket 60, adapted to engage rail member 20 in a reciprocatingly slideable relationship and to support in a movable or stationary manner an article 12 (e.g. console, storage device, container, consumer object, etc.) shown schematically as a center console, and a releasable retainer interface (e.g. lock, latch, etc.) shown as a positioning device 80. Rail member 20, bracket 60, and positioning device 80, cooperate to provide a movable and selectively positionable article attachment system for use in a vehicle. In a particularly preferred embodiment, article attachment system 10 is shown for use within the interior of a motor vehicle (e.g. automobile, minivan, sport utility vehicle, truck, recreation vehicle, etc.). The article attachment system may also be used on an exterior portion of the vehicle, including, but not limited to, a truck bed or cargo storage area. In alternative embodiments, the article attachment system may be used internally or externally in any other vehicle applications such as farm or construction equipment, boats, aircraft or in non-vehicular applications such as production facilities, offices, shops, etc.

Article 12 is coupled to bracket 60 in any suitable conventional manner such as a sliding interference fit, snap-fit connectors, quarter-turn latches, quick-disconnects, spring clips (e.g. Z-axis clips, etc.) or mechanical fasteners (screws, bolts, rivets, etc.). In a particularly preferred embodiment, article 12 is a center console for a vehicle and may include such items as can or cup holders, storage bins, gear shift and brake components, instruments, lights, lids, push-push container holders, cavities, trays, electrical ports for connection of cellular telephones, computers, ports for connection of infotainment devices, such as DVD players, etc. The invention is not to be limited to any particular functionality for the article, the number of articles or any particular relationship between articles if more than one is employed. Two articles can abut one another, but they may, in fact, be arranged to nest, one within the other, etc. In an alternative embodiment, the bracket may be integrally formed with the article or the bracket may be combined with the positioning device as a single unit.

Article 12 may be selectively removed from vehicle by disengaging bracket 60 from rail 20 and removing the article, as will be further described. In an alternative embodiment, the article may be any consumer oriented object or device adapted for use in connection with a vehicle, and configured to receive a bracket, or have an integrally formed bracket, or be configured to be directly received on the rail in a fixed or slideable manner. Such alternative articles may include, among others, storage bins or compartments, cargo management devices, carrier racks, office or entertainment devices, holders, brackets, child safety seats, jump seats, storage platforms, tables, camping gear, etc.

Referring to FIGS. 1, 2, 3 and 5, the rail member 20, is shown according to a preferred embodiment. Rail member 20 has an elongated shape adapted for securing to the floor or base of a vehicle. In a particularly preferred embodiment, rail 20 is laterally (i.e. side to side) centered within the vehicle and extends in a longitudinal (i.e. fore and aft) direction between the front seats (not shown) and may extend between or beneath seats in one or more rows of rear seating (not shown) in the vehicle. Rail 20 may any suitable length and location within the vehicle to suit intended applications. For example, Rail 20 may extend forward to a position that allows article 12 to be positioned beneath, or nested with, an instrument panel or console (not shown) in a forward location of the vehicle interior. Rail 20 may also extend rearward to an intermediate location within the vehicle, or may extend the full length of the vehicle interior to a rearward position that abuts a rearward vehicle portion such as a end wall, lift gate, or cargo section (not shown). Rail 20 may also include a rear stop or end piece 22 that limits movement of article 12 when it reaches the rear end of rail 20. The rear end piece 22 may be removable or reconfigurable to allow article 12 to be removed from rail 20 by sliding article 12 off of the rear end of rail 20. The rear end piece 22 may also be reconfigurable in a manner that serves as a guide for sliding the article onto rail 20. The rail 20 may be provided as a single member or may be provided in multiple segments that may be selectively removed or joined for custom-configuring a rail pattern adapted for a specific vehicle or user application, where the rear end piece 22 may be joined to the rearward end of any such rail segments. In an alternative embodiment, one or more rails may be used and oriented in any suitable direction, or positioned in any suitable location within the vehicle. For example, the rails may be oriented laterally within the vehicle between seating rows, or may be adapted to align with a side door of a vehicle. In another alternative embodiment, the rail may be adapted for direct mounting or removal of articles.

Figure 2:
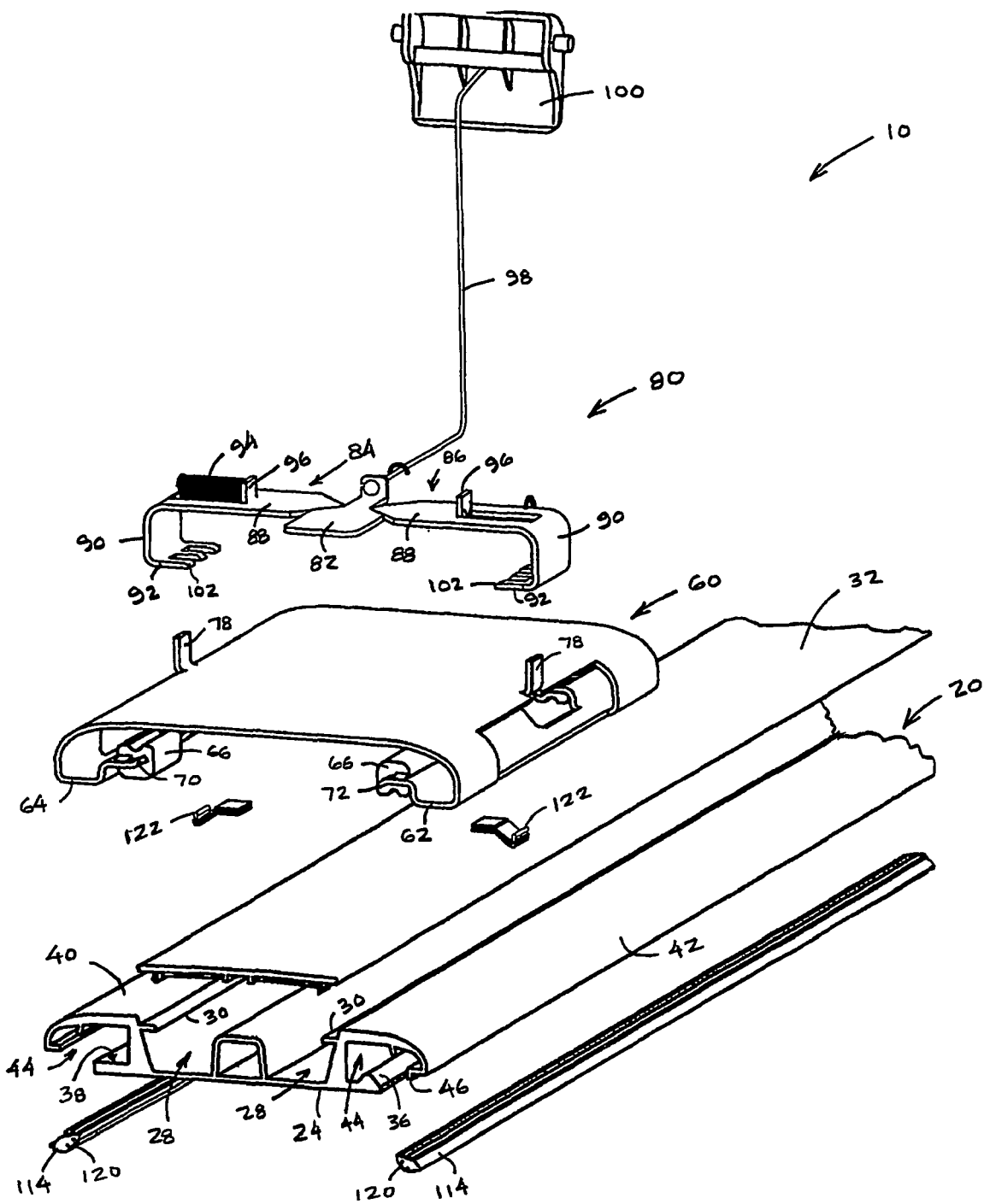
FIG. 2 is a partial exploded perspective view, similar to that of FIG. 1, but showing the additional detail of the system according to a preferred embodiment of the present invention.
Figure 3:
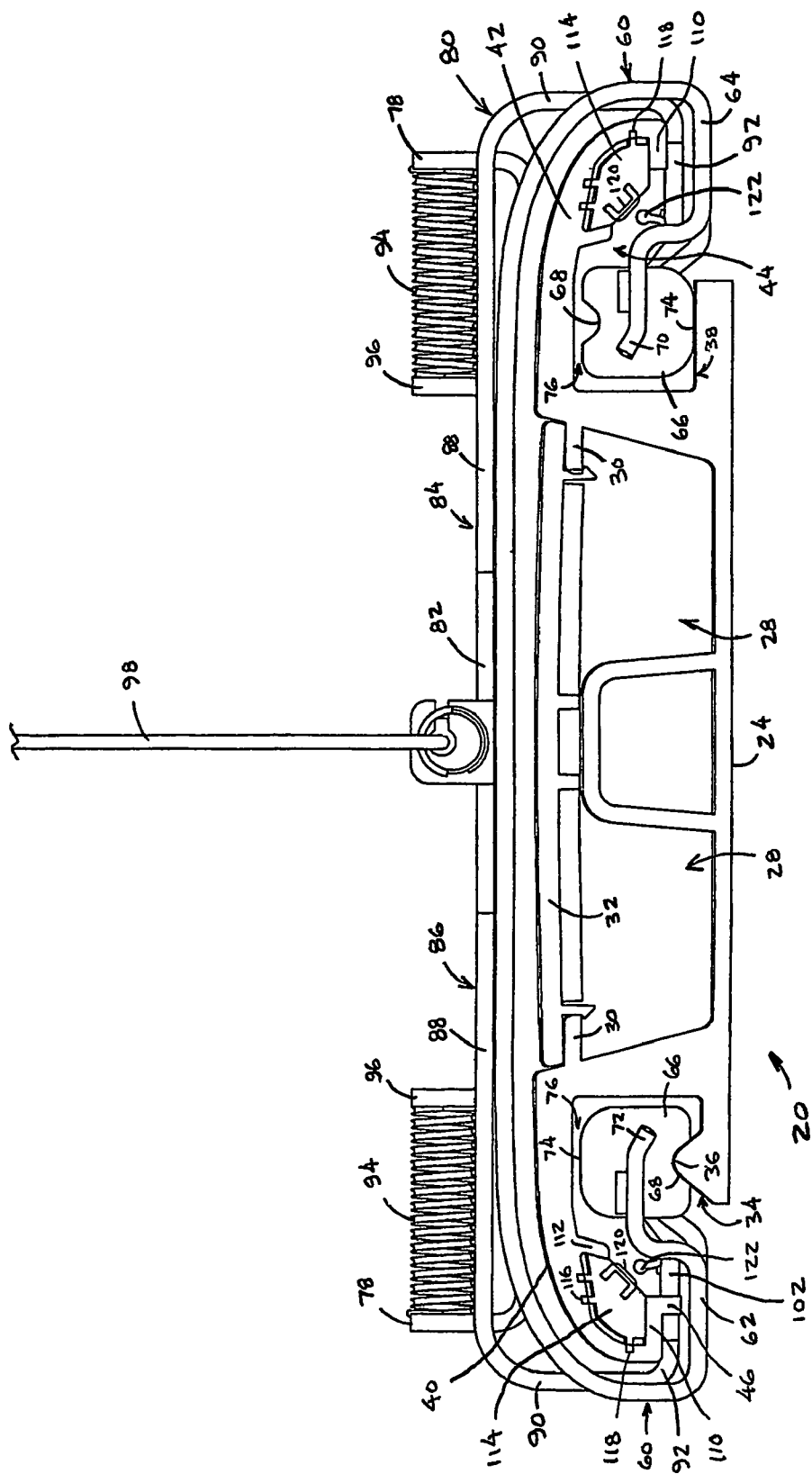
FIG. 3 is an end view from a front end of the article attachment system according to a preferred embodiment of the present invention.
Figure 5:
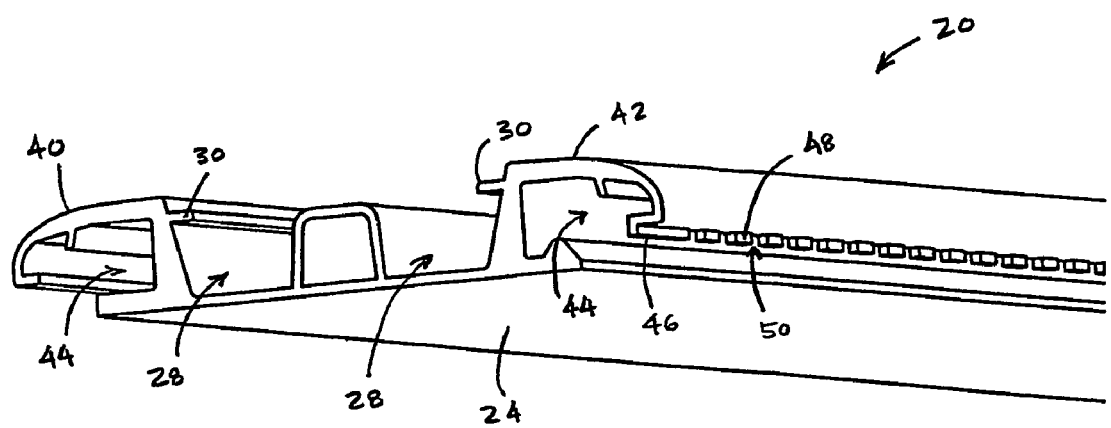
FIG. 5 is a perspective view of a portion of a rail member for an article attachment system according to a preferred embodiment of the present invention.

Referring further to FIG. 2, 3 and 5, rail 20 has a generally flat base 24 that may be attached to a vehicle floor in any suitable manner such as with fasteners 26 (shown schematically as threaded fasteners such as screws or bolts, but may be rivets, adhesives, spring clips (e.g. Z-axis clips), etc.) located within channels 28, or alternatively may be welded to the vehicle floor or formed integrally with the vehicle floor during vehicle floor production. Rails 20 also include receiving structure, shown schematically as ledges 30 for securing a trim member or cover piece 32 that provides a top or cover for channels 28 and provides a generally smooth and continuous appearance for the upper portion of rail 20. In a particularly preferred embodiment, cover piece 32 is preferably a molded plastic piece adapted to engage ledges 30 in a snap-fit type engagement or by suitable spring-type clips (e.g. Z-axis clips, etc.), and is configured to extend along the length of rail 20. Base 24 also includes a first slide interface 34 having a lateral positioning device (e.g. stabilizer, guide, rib, etc.) shown schematically as an upwardly projecting ridge 36 on a first side of base 24 for interfacing with bracket 60 and for guiding the motion of bracket 60 along the length of rail 20 in a manner that minimizes lateral or side-to-side movement or wandering of bracket 60. A second side of base 24 includes a second slide interface (shown schematically as an upwardly facing surface 38) adapted to interface with bracket 60 in a manner that will be further described.

Referring further to FIGS. 2, 3 and 5, rail 20 includes lateral extensions 40 and 42 extending laterally outward from opposite sides of rail 20. Lateral extensions 40 and 42 are shown in a particularly preferred embodiment having a generally rounded contour forming an inner concealed channel or space 44 that has an inverted opening (e.g. downwardly facing) intended to provide a partially concealed area in which exposure to contaminants and other foreign objects into space 44 is minimized. Lateral extension 40 includes a lower portion 46 having a series of downwardly projecting positioning elements (shown schematically as projections 48) that create a generally U-shaped opening 50 between adjacent projections 48 in the general form of a linear rack, and which are adapted to cooperate with positioning device 80, as will be further described. In a particularly preferred embodiment, rail 20 is made of aluminum in an extrusion process. However, in alternative embodiments the rail may be made of magnesium, aluminum, steel, a metal alloy, plastic, or other suitable material in an extrusion, stamping, cold rolling or molding process, or other suitable process. In another alternative embodiment, both lateral extensions may be provided with downward projections for use with a positioning device having correspondingly mating projections. In further alternative embodiments, the partially concealed channel or space may be provided with any suitable orientation to minimize contaminant entry, such as, among others, an inwardly-facing channel or space, or an upwardly-facing channel or space having suitable trim, covers, shields or deflectors.

Referring to FIGS. 2 and 3, the bracket 60 is shown according to a preferred embodiment. Bracket 60 is adapted to couple article 12 to rail 20 in a slideable manner. In a particularly preferred embodiment, bracket 60 has a shape generally corresponding to the outline shape of rail 20 and includes inwardly projecting portions (shown schematically as arms or runners 62 and 64) that are configured to extend into space 44 for operable engagement with ridge 36 and surface 38 on the base 24 of rail 20. In the particularly preferred embodiment, runners 62 and 64 are coupled to a slideable interface (shown schematically as non-rotational glides 66) made of a material having properties of high lubricity and low friction, such as a resin material (PPO, ABS, polycarbonate, etc.) that may be impregnated with a low friction and high lubricity material such as silicone or Teflon®. In the particularly preferred embodiment, runner 64 includes an upwardly-turned end 70 and runner 62 includes a downwardly turned end 72. Ends 70 and 72 are configured to receive glides 66 in a configuration that is intended to promote error-free installation such that the recess 68 of glide 66 is oriented downward to engage ridge 36 on base 24, and flat side 74 of glide 66 is oriented downward to engage surface 38 of base 24 to provide a slideable interface. The glides 66 are sized so that the upward side of glides 66 are positioned with a small tolerance gap 76 with the underside of lateral extensions 40 and 42 that provides suitable clearance along rail 20 to allow bracket 60 to travel smoothly in a longitudinal direction along rail 20. The upward side of glides 66 also serve to vertically restrain bracket 60 and article 12 in an upward direction since the vertical range of motion of glides 66 is limited to the tolerance gap, at which point further upward movement of glides 66, and thus bracket 60 and article 12, is restrained by the underside of lateral extensions 40 and 42. In an alternative embodiment, the glides may be made of plastic or any suitable materials having a composite, impregnated, or homogeneous composition or other structure intended to provide a low friction interface with the rail. In another alternative embodiment, glides may be omitted and the frictional interface provided by portions of the bracket having a suitable size and shape to engage the rail and having a low friction interface. Such a low friction interface may be provided, by way of example, as a coating, overlay, film or impregnation of the bracket material. In a further alternative embodiment, glides may be substituted with rollers, wheels or bearings.

Figure 4:
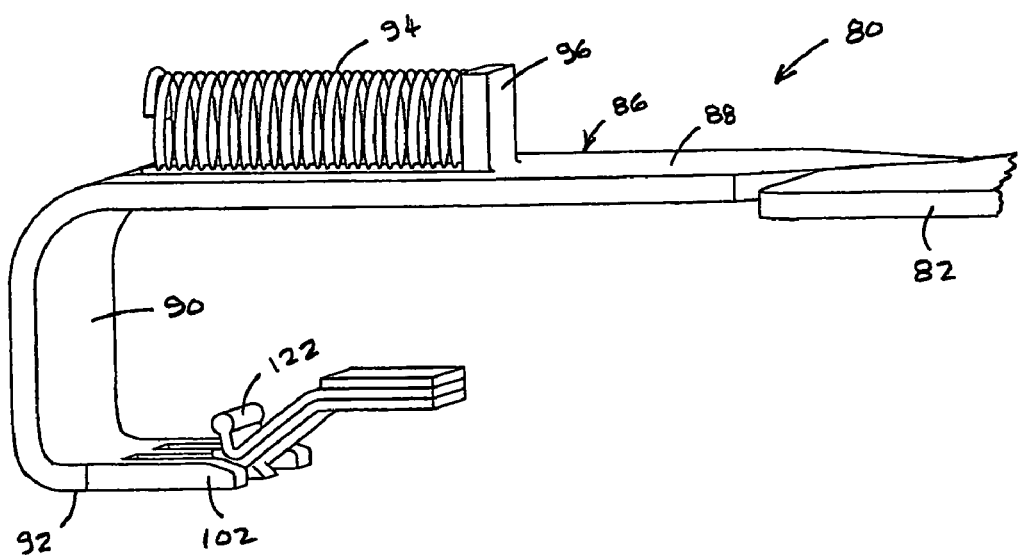
FIG. 4 is a perspective view of a portion of a positioning device for an article attachment system according to a preferred embodiment of the present invention.

Referring to FIGS. 2, 4 and 5, the positioning device 80 is shown according to a preferred embodiment. Positioning device 80 includes an actuator 82, and locking members (shown schematically as brackets 84 and 86) each having an upper flange portion 88, a side wall 90 and a lower flange portion 92. When actuated, actuator 82 is configured to extend brackets 84 and 86 in a laterally outward direction against an inwardly-directed biasing device (shown schematically as a spring 94) to release positioning device 80. When actuator 82 is released, biasing device 94 is configured to retract brackets 84 and 86 inwardly to engage positioning device 80 as will be further described. In a particularly preferred embodiment, upper flange portions 88 and actuator 82 have mating surfaces (shown schematically as angled cam surfaces), configured in a generally common horizontal plane adjacent to the upward side of bracket 60. Brackets 84 and 86 interface with bracket 60 in a laterally slideable manner but are restrained from movement in a longitudinal direction. Upper flange portions 88 include a tab portion 96 aligned with a pair of tab portions 78 on bracket 60 for receiving biasing device 94 (shown schematically as a compression coil spring). Actuator 82 includes an actuating and release extension (shown as actuating cable 98) that extends to a handle 100 on article 12 that may be actuated in a conventional manner for moving actuator 82 in a longitudinal direction. As actuator 82 moves in a first longitudinal direction for releasing positioning device 80, the cam surfaces of actuator 82 engage the cam surfaces of brackets 84 and 86 to extend brackets 84 and 86 outwardly.

As actuator 82 is released, biasing device 94 moves brackets 84 and 86 inwardly, thus moving actuator 82 in a second longitudinal direction for engaging positioning device 80 with rail 20. In a particularly preferred embodiment, actuator 82 is made of plastic and brackets 84 and 86 are made of metal, however, other suitable materials may be used. In an alternative embodiment, biasing device may be any suitable device for urging the brackets in an engaged direction, such as a tension spring, leaf spring, torsion spring, resilient compressible material, etc. In another alternative embodiment, the brackets and actuator may be any suitable material and cam surfaces may have any suitable shape for moving the brackets to a released position. In a further alternative embodiment, the positioning device may be integrated with the bracket or article for mounting on the rail in a fixed or a slideable relationship.

Referring further to FIGS. 3, 4 and 5, lower flange portions 92 of brackets 84 and 86 have extensions shown schematically as inward projections 102 configured to releasably engage the openings 50 in base 20. In a particularly preferred embodiment, lower flange portion 92 and projections 102 form a linear rack and projections 92 may be shaped in the form of a rectangle with square corners, or may have angled or tapered sides, or may have rounded corners. Projections 102 are configured to releasably engage rail 20 by extending into the openings 50 between the downwardly extending projections 48 of lateral extension 40 when positioning device 80 is engaged to prevent longitudinal movement of bracket 60 on rail 20. Projections 102 retract from openings 50 when positioning device 80 is released to permit longitudinal movement of bracket 60 on rail 20. The biasing device 94 is further intended to provide a self-correcting positioning feature by creating a force urging projections 102 inward so that if projections 102 are in an intermediate position where they are not aligned with openings 50 such that they are obstructed by downwardly extending portions 48, any movement of the vehicle which creates inertial movement of the article 12 and bracket 60 in a longitudinal direction will result in projections 102 aligning with, and engaging openings 50. In an alternative embodiment, projections may be provided on only a single lateral side of rail for engaging the rail projections or the projections may be omitted from the positioning device and spring-biased catches, latches, or pawls may be provided to engage openings or notches provided in the base. In a further alternative embodiment, the positioning device may engage the rail by use of conventional securing devices such as a ski-boot type latch, a quarter turn latch, a push-button type latch, set-screw type catches, etc. In another alternative embodiment, the positioning device may include track members such those used in conventional seat track applications.

Referring further to FIGS. 2 and 3, an electrification system for article attachment system 10 is shown according to a preferred embodiment. The electrification system provides a source of electrical power from the vehicle electrical system (such as, but not limited to, 12 volt DC—not shown) to article 12 along the length of rail 20. The inward portion of lateral extensions 40 and 42 include mounting structure (shown schematically as ledge 110 and rib 112) for receiving an elongated conductor carrier (shown schematically as a carrier body 114). In a particularly preferred embodiment, carrier body 114 is an extruded shape made of an electrically insulating material such as plastic, configured to conform with the inward contour of lateral extensions 40 and 42, and extend along the length of rail 20. Carrier body 114 is formed with tolerance adjustment features (shown schematically as extensions 116) that are adapted for insertion into receptacles 118 (e.g. grooves, slots, channels, etc.). The extensions 116 allow the position of carrier body 114 to be adjusted to accommodate tolerance variations along the length of rail 20 by shifting the position of extensions 116 within receptacles 118. Carrier body 114 includes a conductor strip 120 having a contact portion and leg portions that may be inserted into corresponding slots or openings on carrier body 114. Conductors (e.g. wires, leads, pigtails, etc.—not shown) extend from conductor strip 120 to a conventional vehicle electrical power source (not shown). In a particularly preferred embodiment, conductor strip 120 is made of copper or aluminum or other suitable conductive material. In an alternative embodiment, carrier body may have any shape adapted to support a conductor along the rail, or may be integrally formed with the rail (e.g. a rail with a conductive insert or overlay portion, etc.). In another alternative embodiment, a flexible circuit may be provided with wiring that is adapted for accommodating a movable article, such as, for example, a selective take-up and let-out apparatus (e.g. reel device, wires configured in a U-shaped layout, etc.). In a further alternative embodiment, suitable electrical receptacles may be provided at locations along the rail for receiving wire extensions (e.g. pigtails, etc.) from an article to provide electricity to an article mounted on the rail.

Referring further to FIGS. 3 and 4, bracket 60 includes a resilient electrical contact 122 adapted to contact conductor strip 120 along the length of rail 20. In a particularly preferred embodiment, resilient contact 122 is biased into a contact relationship with conductor strip 120 to provide electrical conduction between contact 122 and conductor strip 120 along the length of rail 20. Conductors (e.g. wires, leads, pigtails, etc.—not shown) are operatively coupled to contact and routed to provide a source of electricity to article 12. The electrical system may also include lights (e.g. light strips, LEDs, etc.—not shown) positioned along, or formed within rail 20 for use in illuminating a portion of the vehicle interior when the interior vehicle lights are switched on, or when a vehicle door is opened, using a conventional power supply and switch configuration. Rail 20 may also include sensors (not shown) adapted to provide an alarm or signal when the article is detached from the rail. In a particularly preferred embodiment, the electrical power is twelve (12) volts, direct current (DC). In an alternative embodiment, other voltage levels adapted for use with article 12 may be provided through the use of suitable voltage regulation devices (e.g. transformers, etc.—not shown).

It is important to note that the construction and arrangement of the elements of the article attachment system provided herein are illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, combinations of shapes, etc.) without materially departing from the novel teachings and advantages of the invention. For example, the article attachment system may be used in the interior of any vehicle or non-vehicular application. Also the rail may have any suitable shape, length, location or orientation for use in connection with attaching articles for slideable or fixed positioning. Additionally, the positioning device may include any suitable securing device such as intermeshing elements, quick-releases, latches, etc. configured to releasably secure the bracket and article to the rail in a safe and convenient manner to permit ease of movement or removal, but also retain the article in position in the event of sudden vehicle braking or impact. Any other positioning device already known for vehicle use may be used, for example those used for manual seat adjustment, can be substituted provided that the rail, bracket and positioning device operate smoothly, and that the article be locked securely thereto to avoid separation of the article in the event of a sudden braking or an impact situation. Any form of trim or cover can be applied on the rail for aesthetic and cleanliness purposes, that the rail and bracket be attractive, easily cleanable, etc. Further, it is readily apparent that the rail may be provided in a wide variety of shapes, sizes, thickness, and engagement profiles and adapted for installation along the roof, floor and sides of a vehicle, or within a cargo area or other suitable location within a vehicle. Also, the enclosed space formed by the rail may be provided in any suitable shape by any suitable rail configuration to conceal the moving or engaging parts of the positioning device to minimize exposure to users and to provide a streamlined, unobtrusive, aesthetically pleasing appearance. It is also readily apparent that articles may be in the form of any removable object useful in connection with a vehicle and may be designed with any profile suitable for attaching to the rail for stationary use or slidable movement along the rail. The article in the form of a console may be any suitable size to hold beverage cups, cans, and the like and includes electrical ports, such as those used for cigarette lighters, the connection of cellular telephone charging devices, etc. Accordingly, all such modifications are intended to be within the scope of the invention.

While the present invention has been described in connection with a particularly preferred embodiment thereof, the invention is not to be limited by the drawings. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

The invention claimed is:

1. An article attachment system for a vehicle, comprising: an elongated rail member adapted to attach to the vehicle; the rail member defining at least one partially enclosed space having at least one slide interface along an interior surface of the rail member and a plurality of projections; a bracket having at least one glide slidably engaging the slide interface on the interior surface of the elongated rail member and adapted for mounting at least one article; a positioning device operably engaging the bracket and having at least one extension adapted to move between an engaged position adapted for securing the article to the elongated rail member and a released position adapted for moving the article relative to the elongated rail member; and a conductor strip coupled to the elongated rail member and adapted to deliver electrical power to the article.

2. The article attachment system of claim 1, wherein the elongated rail member is adapted for placement longitudinally within the vehicle.

3. The article attachment system of claim 1, wherein the elongated rail member is adapted for placement laterally within the vehicle.

4. The article attachment system of claim 1, wherein the elongated rail member is adapted to attach to an interior portion of the vehicle.

5. The article attachment system of claim 1, wherein the elongated rail member and bracket are configured to vertically restrain the article.

6. The article attachment system of claim 1, wherein the conductor strip is coupled to the rail member by a carrier having at least one tolerance adjusting device.

7. The article attachment system of claim 1, wherein the bracket includes a contact biased for sliding engagement with the conductor strip.

8. The article attachment system of claim 1, wherein the at least one glide is two glides.

9. The article attachment system of claim 8, wherein the glide is a low-friction, high-lubricity material.

10. The article attachment system of claim 1, wherein the bracket further comprises runners operably engaging the slide interface.

11. The article attachment system of claim 1, wherein the slide interface further comprises a lateral positioning device.

12. The article attachment system of claim 1, further comprising a trim piece coupled to the elongated rail member.

13. The article attachment system of claim 1, wherein the elongated rail member is adapted to removably receive the article.

14. The article attachment system of claim 1, wherein the positioning device is biased in a self-correcting direction.

15. The article attachment system of claim 1, wherein the positioning device includes an actuator capable of remote actuation and operable to move the extension between the engaged position and the released position.

16. A sliding floor console system for a vehicle interior, comprising: an elongated rail member coupled to the vehicle interior, the elongated rail member having a first electrical conductor and defining at least one partially concealed channel having a slide interface; a bracket adapted to couple to a console, the bracket having at least one non-rotational glide slidably engaging the slide interface for longitudinal movement along the elongated rail member and a second electrical conductor configured to movably engage the first electrical conductor; and a positioning device coupled to the bracket for selectively securing the console at one of a plurality of locations along the elongated rail member.

17. The article attachment system of claim 16, wherein the elongated rail member includes a plurality of positioning elements.

18. The article attachment system of claim 16, wherein the positioning device includes an actuator adapted for remote actuation from the article.

19. The article attachment system of claim 16, wherein the elongated rail member includes at least one lateral extension portion.

20. The article attachment system of claim 16, wherein the elongated rail member includes an end piece adapted to limit the position of the article.

21. The article attachment system of claim 16, wherein the positioning device includes at least one locking member operably engaging the actuator for extension and retraction in a lateral direction.

22. The article attachment system of claim 21, wherein the bracket and the positioning device coact through a biasing device.

23. The article attachment system of claim 22, wherein the biasing device is a spring.

24. The article attachment system of claim 23, wherein the biasing device provides a self-correcting interaction between the locking member and the elongated rail member.

25. The article attachment system of claim 16, wherein the glide is configured for coupling to the bracket only in a single orientation.

26. An article attachment system, comprising: a rail member adapted for attachment to a vehicle, the rail defining at least one partially enclosed space having at least one surface adapted for slideable engagement; a bracket member adapted to couple to an article and adapted to slideably engage the surface; an electrification system configured to provide a source of electricity from the rail member to the article; a positioning device adapted to releasably secure the article in any one of a plurality of locations on the rail member; and an actuator adapted to move the positioning device between an engaged position where movement of the article is prevented and a released position where movement of the article is permitted.

27. The system of claim 26, wherein the rail member includes a plurality of projections disposed within the partially enclosed space.

28. The system of claim 27, wherein the rail member includes a plurality of projections only on a single side of the rail member.

29. The system of claim 26, further comprising a glide member adapted to interface between the bracket and the surface.

30. The system of claim 26, wherein the glide member is non-rotational.

31. The system of claim 26, wherein the electrification system further comprises a conductive strip coupled to the rail member.

32. The system of claim 26, further comprising an end piece adapted to couple to an end of the rail member.

33. The system of claim 26, further comprising a biasing device adapted to bias the positioning device in a self-correcting direction.

34. A method of providing a sliding console system for use in a vehicle interior, the method comprising: providing a rail member adapted for coupling to the vehicle, the rail member defining a partially enclosed space having a slide surface; providing a bracket at least partially surrounding the rail member and adapted to receive a console; providing at least one arm extending from the bracket into the partially enclosed space, the arm including a glide adapted to engage the slide surface; coupling a positioning device to the bracket, the positioning device adapted for movement between an engaged position where the positioning device engages the rail member and a released position where the positioning device is substantially free of engagement from the rail member; and coupling the console to the rail member.

35. The method of claim 34, wherein the slide surface provides a slideable interface with the glide.

36. The method of claim 34, wherein the slide surface provides a non-rotational interface with the bracket.

37. The method of claim 34, further comprising the step of providing a biasing device adapted to urge the positioning device into the engaged position.

38. The method of claim 34, further comprising the step of providing a trim portion adapted to couple to the rail member.

39. The method of claim 34, further comprising the step of providing an actuator adapted to move the positioning device between the engaged position and the released position.

40. The method of claim 34, further comprising the step of providing an electrification system adapted to couple to the rail member for providing electricity to the article.

41. A system for movably attaching one or more articles to a vehicle portion, comprising: an elongated rail member configured for attachment to the vehicle and having at least one lateral extension projecting at least partially over a slide surface to form a space that is at least partially concealed; a bracket at least partially surrounding the elongated rail member and lateral extension and having an arm projecting into the space; an article coupled to the bracket; and a non-rotational low friction member interfacing between the arm and the slide surface configured to permit movement of the article along the elongated rail member.

42. The system of claim 41, wherein the vehicle portion is a vehicle interior portion.

43. The system of claim 41, wherein the arm projects at least partially beneath the lateral extension further comprising means for moving the article relative to the elongated rail member.

44. The system of claim 41, wherein the elongated rail member further comprises two lateral extensions and two slide surfaces.

45. The system of claim 41, further comprising an electrification system having at least one resilient contact configured to provide electricity to the article.

* * * * *